Patented Nov. 1, 1938

2,134,825

UNITED STATES PATENT OFFICE 2,134,825

CHEMICAL PROCESS

Julian W. Hill and Ralph A. Jacobson, Wilmington, Del., assignors to E. I. du Pont de Nemours & Company, Wilmington, Del., a corporation of Delaware No Drawing. Application August 30, 1937, Serial No. 161,694

20 Claims. (Cl. 260—10)

This invention relates to new compositions of matter and to processes for their preparation. More particularly, it relates to new cellulose derivatives, and still more particularly to reaction products of certain ureas and cellulose which are soluble in dilute aqueous caustic, and to processes for preparing them.

It is known to solubilize cellulose and its derivatives by dissolving the same in a solution consisting of aqueous caustic soda and urea at room temperature or below, and it has also been proposed to stabilize ordinary viscose solutions by incorporating therein amide- or imide-containing substances; but so far as we are aware cellulose has never heretofore been chemically reacted with a urea to form a nitrogen-containing cellulose derivative soluble in dilute aqueous alkali and useful in the arts.

An object of this invention is to provide new and useful cellulose derivatives which are soluble in dilute aqueous caustic soda. Another object is to provide new compositions of matter by reacting cellulose with certain ureas, said new compositions of matter being soluble in dilute aqueous caustic soda. A further object is to provide solutions of such new cellulose derivatives in dilute aqueous caustic soda which are useful for casting films, for spinning filaments, or for sizing textiles, paper, etc. A still further object is to provide processes for the preparation of the aforementioned new cellulose derivatives and their solutions. These and other objects will be apparent from the following description of the invention.

These objects are accomplished according to this invention by causing a urea of the type more particularly described below, to react with cellulose to produce nitrogen-containing cellulose derivatives, and dissolving the reaction product in dilute aqueous caustic soda.

The invention may be more specifically stated as comprising the impregnation of cellulose such as wood pulp or cotton linters with a urea of the type more specifically described below, at suitable temperatures (the urea being employed either alone or in solution or suspension in suitable liquids), removing excess urea and auxiliary liquids, heating the impregnated cellulose at a suitable temperature, and dissolving the product in dilute aqueous caustic soda.

We have discovered that urea and cellulose react when they are heated together under suitable conditions, to form new cellulose derivatives which go into solution in dilute aqueous caustic at low temperatures, for example —5° C., and which remain in solution therein at room temperatures.

We have further discovered that certain other ureas which contain at least one unsubstituted amido group also react with cellulose, under substantially the same conditions as urea itself, to form products which are soluble in dilute cautic. These ureas may be represented by the formula:

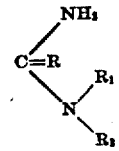

where R is oxygen or sulfur, and where $R_1$ and $R_2$ are either or both hydrogen or monovalent hydrocarbon radicals containing less than five carbon atoms, such as methyl, ethyl, propyl or butyl, or monovalent organic radicals containing less than five carbon atoms and consisting of carbon, hydrogen, and oxygen only, such as hydroxymethyl. Specific ureas which are suitable for use in this invention are urea itself, methyl urea, unsymmetrical dimethyl urea, ethylurea, n-propylurea, n-butylurea, unsymmetrical diethylurea, thiourea and the corresponding mono- and unsymmetrical dialkyl thioureas.

The new cellulose derivatives generally contain from about 1.0 to 2.5% nitrogen, although they may contain more or less thereof when prepared under suitably modified conditions. The new derivatives exhibit many of the properties of other low-substituted cellulose derivatives such as the alkyl cellulose ethers. For convenience, and in the absence of any definite knowledge as to their nature, we shall hereinafter refer to the new cellulose derivatives as "urea-celluloses". It is to be understood that we are limited as to the nature of the reaction products only by our description thereof.

The new cellulose derivatives can be prepared in a number of ways. One method consists essentially in (1) steeping cellulose, such as wood pulp or cotton linters, in an excess volume of an aqueous solution of at least 15% urea and 2 to 10% sodium hydroxide, preferably containing a small quantity of a wetting agent such as cresol or sodium "Lorol" (the fraction of saturated alcohols obtained by hydrogenation of coconut oil, and consisting mainly of $C_{12}$ and $C_{14}$ alcohols) sulfate; (2) pressing the impregnated cellulose until it contains from about 0.75 to about 2.5 parts by weight of the steeping liquor per part of the original dry cellulose; the concentration of the steeping liquor and the press ratio are so adjusted that after pressing there is from 2 to 12 parts, and preferably from 4 to 8 parts by weight of sodium hydroxide, and from 10 to 50 parts, and preferably from 20 to 40 parts of urea per 100 parts of original dry cellulose; (3) drying the pressed material; (4) baking the dry product at reaction temperature, preferably at 120°–150° C. (although higher temperatures may be used provided the time of heating is suitably adjusted), until the product is soluble in dilute aqueous caustic alkali and discontinuing baking before the product becomes insoluble; and (5) washing the baked product to improve its color and to remove unreacted urea and by-products. Step 3 may, if desired, be combined with Step 4, as in Example I, so that the drying and baking steps are performed simultaneously. In this modification the oven temperature may be considerably increased, thereby greatly increasing the reaction rate and decreasing the reaction time. Thus, for the continuous modification suitable oven temperatures range from about 150° C. up to about 300° C. depending on other conditions present. In any event, temperatures at which decomposition of product sets in are to be avoided. The final product after drying has much the appearance of the original cellulose except that it is sometimes buff or light brown in color. It may be dissolved to the extent of about 8 parts by weight in 92 parts by weight of 6 to 10% aqueous caustic soda by shredding and stirring with the alkali solution while the mixture is cooled to about —5° to —10° C. After solution has been effected, the mixture is allowed to warm up to room temperature. The product is then in its most convenient form for use.

The solutions thus prepared, however, may in some cases be more or less unstable so that they gel or become viscous after a period of standing. It has been found that much more stable solutions can be prepared by incorporating small proportions of zinc oxide or beryllium oxide into the caustic solution before the urea-cellulose is dissolved therein. We accordingly prefer to prepare the solutions of the new urea-celluloses in aqueous caustic as follows: The dry urea-cellulose is moistened thoroughly with a definite amount of water and then sufficient concentrated sodium hydroxide-sodium zincate solution (e. g., 21% sodium hydroxide containing about 4.2% zinc oxide) is added to give a concentration of about 1.4% zinc oxide and 7% caustic in the final solution (which may consist, for example, of 7 parts by weight of urea-cellulose, 8 parts by weight of caustic soda, 2.4 parts by weight of sodium zincate, and 82.6 parts by weight of water). This procedure prevents the formation of lumps of undissolved material. The mixture is stirred for a few minutes to insure homogeneity, the required amount of water is then added, and the mixture is rapidly cooled to approximately —10° C. It is convenient to add ice as part or all of the water to insure more intimate cooling. After continued stirring for about fifteen minutes, the solution is usually sufficiently homogeneous to be filtered. Freezing the solutions is to be avoided since it accelerates gelation. The higher the concentration of caustic or urea-cellulose in the solutions, the more rapidly they gel after freezing.

The viscosity of the solutions thus prepared depends upon the viscosity characteristics of the original cellulose, and also upon the process used in preparing the urea-celluloses. The viscosity of the solutions can, for example, be reduced by the addition of small proportions of degradation promoters such as ferric chloride or hydrogen peroxide to the steeping bath, or by digesting the urea-cellulose, after pressing and baking, with dilute hydrogen peroxide at about 55° C. for about three hours. Sodium hypochlorite and oxalic acid can also be employed in the same manner. Hydrogen peroxide can also be added to the steeping bath, and the caustic soda may or may not be omitted therefrom, as desired, when hydrogen peroxide is present, in order to produce urea-celluloses of relatively low viscosity.

The viscosity of the aqueous caustic soda solutions can also be varied by the drying and baking technique. For example, if the pressed sheets of cellulose, i. e. cellulose impregnated with proper proportions of the steeping liquor, are baked without appreciable previous drying, the urea-cellulose which is produced is of a high-viscosity type. If, on the other hand, the pressed sheets of cellulose are first dried at relatively low temperatures (i. e., 20°–60° C.) for relatively long periods of time (one to four days) and then baked, a low-viscosity type of urea-cellulose results. Relatively high concentrations of caustic in the steeping bath (e. g., 10%) also produce relatively low-viscosity type urea-celluloses. By the proper choice of the cellulose and of steeping baths, baking conditions and stabilizers, solutions of the new urea-celluloses may be produced which can be readily filtered and which have convenient and satisfactory working viscosities, clearness, color, and stability.

The general procedure outlined above may be carried out in a series of steps (i. e., as batch operations) as indicated. It is, however, advantageous in large scale operations to make the process continuous, as for example, by passing the sheeted cellulose at a suitable rate through the steeping bath, then through squeeze rolls which press out the excess steeping liquor; the impregnated sheets may then be passed through a hot air-blast oven which continuously dries and bakes the sheets at any desired temperature and for any desired period of time, thus causing the urea to react with the cellulose. The dried and baked product, which is generally buff or light broken in color, is then washed with water. The washing operation gives the product a considerably lighter color and removes any water-soluble substances, thereby improving its stability during storage. It should be noted that in the presence of caustic soda and under the conditions of baking, most of the urea either reacts with the cellulose or decomposes. The washed product may be dried in air by any suitable means and stored until needed, or it may be dissolved in aqueous caustic soda without drying.

In the continuous process, the rate at which the sheeted cellulose is passed through the drying and baking oven will depend upon the temperature of the oven itself and, also, upon the press ratio (i. e., the ratio of the weight of the wet pressed sheets to that of the original dry cellulose they contain). The higher the oven temperature, the higher the reaction rate and the faster the sheets can be passed through the oven. The higher the press ratio, and therefore the more water present in the pressed sheet, the slower they must be passed through the baking oven. In other words, when operating the continuous modification of this invention temperature, press ratio, and conveyor speed are to be coordinated to the end that the reaction is completed to the soluble stage but that the product passes out of the baking zone before it becomes insoluble.

As the source of the cellulose used in this invention, we may employ substances such as the various types of wood pulp, cotton linters, cotton fibers, and other natural or artificial fibers consisting essentially of cellulose. The cellulose may be used in the original raw state or after bleaching, or in the form of cellulose hydrates, alkali-treated cellulose, and the degraded celluloses derived from cellulose by treatment with acids, zinc chloride, etc. Wood pulp and cotton linters are preferred. It is to be understood that the cellulose may be used in the form of fibers, yarns, woven, knitted, etc., textiles or cloth, or in the form of filaments, fibers, yarns, cloth, films, sheets, etc., of regenerated cellulose.

In general, the process described above is preferred, but many modifications other than those already mentioned can be made with satisfactory results. For example:

(1) Compounds forming alkali metal or alkaline earth metal ions and having a basic reaction in aqueous solutions can be used in whole or in part in place of the sodium hydroxide in the steeping bath. Thus, the steeping liquor may be composed of aqueous solutions of urea containing, for example, sodium carbonate, calcium hydroxide, sodium phosphate, sodium acetate, sodium bicarbonate, sodium sulfide, or borax, or mixtures thereof. Many such compounds serve almost or quite as well as sodium hydroxide in the steeping liquor. Organic bases such as quinoline can also be used, especially in conjunction with proper solvents such as alcohol or alcohol-water mixtures.

(2) Certain organic solvents can be substituted for water in the steeping bath, e. g., methanol or other alcohols boiling below about 150° C.

In addition, cellulose derivatives more or less soluble in dilute aqueous caustic can be obtained when the steeping solution for the cellulose contains, in addition to the aqueous solutions of urea, water-soluble acidic substances such as hydrochloric acid, urea nitrate, and ferric chloride. Auxiliary substances such as degradation promoters, wetting agents, etc., may also be present in the steeping baths.

The following examples will serve to illustrate the practice of this invention in its preferred embodiment, as well as in some of the aforementioned modifications.

Example I

This example illustrates the preferred method of preparing a typical medium-viscosity cellulose carbamate by the continuous process.

A standard sulfite wood pulp widely used in the manufacture of viscose rayon, in the form of rolls 5 inches wide, was passed through a steeping bath consisting of 7.5% sodium hydroxide, 37% urea, 0.1% sodium "Lorol" sulfate (as a wetting agent), and 55.4% water by weight, at 65° C. at such a rate that every part of the pulp was steeped in the bath for about one minute. The impregnated pulp sheet was then passed through squeeze rolls to obtain a press ratio of 2.1 (i. e., 1.1 pounds of steeping liquor and 1 pound of dry pulp), and then into a hot air-blast oven, heated at 260° C., at a rate sufficient to cause baking of the pressed pulp for two minutes. (Since the bake oven was three feet long, the sheet of pressed pulp traveled at a rate of about 18 inches per minute.) On emerging from the bake oven, the dry pulp was light brown. It was washed with hot water. The product, a light buff-colored fibrous solid, dissolved readily in dilute aqueous caustic with cooling. For example, 6 grams of the product dissolved (with chilling, as already described) in 94 grams of an aqueous solution containing 7% caustic soda and 1.4% zinc oxide (the latter being present, of course, as sodium zincate). The resulting solution had a viscosity of 85 poises at 25° C. This solution was readily filterable through a standard rayon filter. From the filtered solution clear, fiberless, transparent films of excellent flexibility and tensile strength were cast by treatment with dilute acids and washing with water. The solution was also similarly spun into serviceable filaments having good tenacity and other properties. The solution was stable to gelation indefinitely at ordinary laboratory temperatures.

Instead of the 260° C. used in the above example, other temperatures may be used providing the time of treatment is adjusted so that the baking is continued until the product is soluble in dilute caustic soda and is thereupon discontinued. Thus, when the temperature of the oven is 160° C. the entire time required for drying and baking is about eighteen minutes to obtain a product soluble in dilute caustic soda.

Example II

Example I was repeated except that the steeping bath contained 5% (instead of 7.5%) of caustic soda. A somewhat more difficultly soluble and difficultly filterable product was obtained; a 6% solution of which (prepared according to Example I) had a viscosity of 190 poises.

Examples I and II illustrate how the viscosity of the final solutions can be varied by using steeping baths having different concentrations of caustic.

Example III

Example I was repeated except that no zinc oxide was used in the aqueous caustic used to dissolve the product. The resulting solution was similar to that obtained in Example I, except that the urea-cellulose dissolved more slowly and that the solution gelled within two days on standing.

Example IV

This example illustrates the step-by-step or batchwise method of preparing the new cellulose derivatives described herein.

One thousand five hundred (1500) grams of high alpha-cellulose sulfite wood pulp were steeped at about 25° C. for two and one-half hours in a bath of the following composition:

| | Grams |
|---|---|
| Water | 7100 |
| Sodium hydroxide | 410 |
| Urea | 2500 |

The mass was then pressed to 4500 grams, wrapped in a damp cloth, and placed in an air-blast oven at about 60° C. for forty-eight hours. The product was then baked at 130° C. in a blast of air for three hours, precaution being taken to spread the sheets of pulp to insure uniform heating. The sheets were then removed, shredded, washed well with water, and dried at 60° C. in air for about sixteen hours. Yield, 1650 grams. A 7% solution of the product in an 8% sodium hydroxide—1.6% zinc oxide aqueous solution had an initial viscosity of 50–53 poises at 25° C.

Unsupported films cast from the solution described in the preceding paragraph, by treatment with dilute acids and subsequent washing with 3% aqueous glycerol, had a tensile strength of 11,700 pounds per square inch and could be flexed (creased) sharply more than 500 times without breaking.

Fibers were spun from a similar solution containing 7% of the urea-cellulose described in Example IV. Such fibers were found to have a dry tensile strength of 1.6 grams/denier, and a wet strength of 0.57 gram/denier, and an 8% elongation when dry, or 15% elongation when wet.

A portion of the urea-cellulose prepared as described in Example IV, after being thoroughly washed in hot water and then dried at 105° C. for several hours in an air-blast, was found to contain 1.92% nitrogen by the Kjeldahl method. A blank run on the original cellulose showed that it contained only 0.12% nitrogen.

Example V

This example illustrates the use of hydrogen peroxide for reducing the viscosity of the urea-cellulose in aqueous caustic.

One hundred (100) grams of a standard sulfite wood pulp used in the manufacture of viscose rayon were steeped at room temperature for one hour in a bath composed of 20% urea, 4% sodium hydroxide, and 76% water by weight, then pressed to a ratio of 2.5, dried in a blast of air at 55°–60° C. for sixteen hours, and baked in air at 130° C. for 170 minutes. The product was shredded, washed by slurrying in water, and dried. Portions of the dried product were suspended in an M/20 solution of borax, and small amounts of hydrogen peroxide were added thereto, the solutions being well mixed and digested at 55° C. for three hours. The conditions and resulting viscosities are shown in the following table:

*Table I*

| Weight of urea-cellulose (grams) | Weight of $H_2O_2$* (grams) | Total volume of solution (cc.) | Concentration of urea-cellulose in solution (percent) | Viscosity of solution after treatment (poises) |
|---|---|---|---|---|
| 3.0 | None | 100 | 3.0 | 20.0 |
| 3.0 | 0.8 | 100 | 3.0 | 6.0 |
| 10.0 | 2.0 | 500 | 2.0 | 3.4 |

* The data refer to the weight of pure hydrogen peroxide, which was added as a 30% aqueous solution.

Example VI

This example illustrates the use of hydrogen peroxide in the steeping bath, in the absence of sodium hydroxide, for reducing the viscosity of urea-cellulose in aqueous caustic.

One hundred (100) grams of a standard sulfite wood pulp used in the manufacture of viscose rayon was steeped for ten minutes at 50° C. in a solution composed of 66 grams of 30% aqueous hydrogen peroxide, 300 grams of urea, and 1634 grams of water. The sheets were then pressed to a 2.5 press ratio and baked for fifteen minutes at 150° C. The product dissolved readily in dilute aqueous caustic. Seven (7) grams of the product, for example, dissolved in 93 grams of an aqueous solution containing 8% sodium hydroxide and 1.6% zinc oxide (as sodium zincate). The resulting solution had a viscosity of 25.0 poises. A corresponding 5% solution of the product had a viscosity of 4.0 poises.

Example VII

Example VI was repeated except that the steeping bath was composed of 66 grams of 30% hydrogen peroxide, 300 grams of urea, 80 grams of sodium hydroxide, and 1554 grams of water. The 5% solution of the resulting product in an 8% sodium hydroxide-1.6% zinc oxide aqueous solution had a viscosity of 12 poises. A corresponding 7% solution of the product had a viscosity of 32.0 poises.

Examples VI and VII show that the viscosity of urea-cellulose is reduced more slowly by hydrogen peroxide in the presence of sodium hydroxide than in its absence.

Example VIII

This example illustrates the effect of ferric chloride in reducing the viscosity of urea-cellulose.

Two solutions were prepared of the following compositions:

| Solution A | | Solution B | |
|---|---|---|---|
| Urea | 1000 grams | Urea | 1000 grams |
| Sodium hydroxide | 200 grams | Sodium hydroxide | 200 grams |
| Water | 3800 grams | Water | 3800 grams |
|  |  | 10% aqueous solution of ferric chloride ($FeCl_3$) | 5 cc. |
|  |  | Potassium tartrate in Water | 1 gram 10 cc. |

Five hundred four (504) grams of a standard sulfite wood pulp were placed in each solution and allowed to steep therein for about three hours at 20° C. Each portion of impregnated pulp was then pressed to a ratio of about 2.5. The two lots of pressed pulp were air-dried at 55° C. for four hours and then baked for three hours at 130° C. Three per cent solutions in 10% aqueous sodium hydroxide were prepared from each product. It was found that the solution containing the product from steeping bath A had a viscosity of 17.6 poises, while the solution prepared from the product of steeping bath B had a viscosity of 4.7 poises.

The potassium tartrate used in steeping bath B was employed to prevent the ferric chloride from precipitating as the hydroxide.

Example IX

In Example IV there is described the preparation of a medium-viscosity product by baking the pressed cellulose-steeping liquor mixture for about three hours. By baking for shorter periods of time, higher viscosity products are obtained. For example, 75 grams of the same type of wood pulp used in Example IV were steeped for twenty minutes at 55° C. in a 20% urea-4% sodium hydroxide solution and pressed to a 2.5 press ratio. It was then baked at 130° C. for fifty-five minutes, shredded, washed and dried at 55° C. A 4% solution of the product prepared in the usual manner using an aqueous 8% sodium hydroxide-1.6% zinc oxide solvent had a viscosity of 95 poises. Films cast from this solution had a tensile strength of 6500 pounds per square inch.

Example X

One hundred (100) grams of cotton linters were steeped for about twenty minutes in a solution containing 20% urea, 4% sodium hydroxide, 0.016% ferric chloride, 1 gram potassium tartrate (to prevent precipitation of iron), and 0.25% sodium "Lorol" sulfate (used as a wetting agent for the cellulose). The impregnated linters were then pressed to a ratio of 2.5, baked at 130° C. for three hours, shredded, washed well with water, and dried in air for sixteen hours at 55° C. A 3% solution of the dried product in 10% sodium hydroxide had a viscosity of 1.7 poises at 25° C., was readily filterable, and was stable at ordinary laboratory temperatures for three days.

The following three examples illustrate the substitution of other basic materials for the caustic soda which is ordinarily used in the steeping bath.

*Example XI*

One hundred (100) grams of a standard sulfite wood pulp were steeped at room temperature for fifteen minutes in a solution of 100 grams of sodium carbonate, 500 grams of urea, and 1400 grams of water. The pulp was then pressed to a ratio of 2.5, baked at 130° C. for two hours, washed and dried. Three (3) grams of the product dissolved readily in 97 grams of an 8% sodium hydroxide-1.6% zinc oxide solution, forming a solution free of fibers and having a viscosity of 32 poises.

*Example XII*

Two hundred (200) grams of a standard wood pulp were steeped for fifteen minutes at 40° C. in a bath of the following composition:

|  | Grams |
|---|---|
| $Na_3PO_4.12H_2O$ | 170 |
| Urea | 366 |
| Water | 930 |

The impregnated pulp was pressed to 500 grams, baked at 130° C. for one hour, washed and dried. A solution of 3 grams of the product in 97 grams of an 8% sodium hydroxide-1.6% zinc oxide solution was moderately viscous and substantially free of fibers.

*Example XIII*

One hundred fifty (150) grams of a standard sulfite wood pulp in sheet form were steeped for twenty minutes at 50° C. in a solution of the following composition:

|  | Grams |
|---|---|
| Sodium acetate ($3H_2O$) | 208 |
| Urea | 500 |
| Water | 1800 |

The mass was then pressed to 375 grams and baked at 130° C. for one hour. After washing with water, 3 grams of the product dissolved in 97 grams of an 8% sodium hydroxide-1.6% zinc oxide solution at —10° C., and the resulting solution at room temperature was found to be free of fibers and to have a viscosity of about 50 poises.

Organic solvents can be substituted in whole or in part for the water used in the preceding examples. Organic bases can, furthermore, be substituted for the basic materials employed therein. Examples XIV and XV illustrate such modifications of this invention.

*Example XIV*

Fifty (50) grams of a standard wood pulp were steeped for ten minutes at 30° C. in a solution of the following composition:

|  | Grams |
|---|---|
| Urea | 100 |
| Quinoline | 25 |
| Ethanol (95%) | 160 |
| Water | 400 |

The pulp was then pressed to 125 grams and baked at 140° C. for one hour, washed with water and dried at about 55° C. for several hours in air. Three (3) grams of the dried material dissolved in 97 grams of a 7% sodium hydroxide-1.2% zinc oxide solution chilled to about —10° C. to give a solution having a viscosity of about 18 poises and substantially free of fibers.

*Example XV*

Fifty (50) grams of a standard wood pulp were steeped in a solution of the following composition for fifteen minutes at 60° C.:

|  | Grams |
|---|---|
| Urea | 150 |
| Sodium hydroxide | 20 |
| Methyl alcohol | 330 |

The pulp was then allowed to drain to a weight of 93 grams. The impregnated material was then baked at 130° C. for eighty minutes and washed with water. Three (3) grams of the dry product in 97 grams of an 8% sodium hydroxide-1.6% zinc oxide solution yielded a good solution having a viscosity of 11 poises. Films cast from this solution by treatment with 20% sulfuric acid had good wet strength and flexibility, especially when subsequently treated with a 3% aqueous solution of glycerol.

Examples XVI, XVII and XVIII illustrate the use of ureas other than urea itself.

*Example XVI*

Sheets of a standard sulfite wood pulp were steeped in a 23.4% (saturated) solution of unsymmetrical dimethylurea and 2% sodium hydroxide. The sheets were removed after two hours (at room temperature), drained and dried in air at 55° C. They were then heated in air at 150° C. for approximately twenty minutes, washed and dried. The product was soluble to the extent of about 3 parts by weight in 97 parts by weight of 10% aqueous sodium hydroxide.

*Example XVII*

Twenty (20) grams of shredded wood pulp were mixed with 500 cc. of isobutyl alcohol containing 40 grams of sodium urea in solution. The mixture was stirred vigorously and heated to 107° C. for six and one-half hours. Ammonia gas was given off continuously during this time. The solution was filtered and the solid product was washed with ethyl alcohol. The material was then air-dried. Three (3) grams of this material dissolved in 97 grams of a solution of 9% sodium hydroxide and 1.8% zinc oxide, the resulting solution being substantially free of fibrous material and having a viscosity of about 50 poises.

*Example XVIII*

One hundred (100) grams of wood pulp were steeped at 30° C. for fifteen minutes in a 10% aqueous solution of thiourea containing 3% caustic soda, pressed to 300 grams, baked without preliminary drying at 130° C. for three hours, washed and dried. The product was soluble to the extent of 4% in 10% sodium hydroxide-2% zinc oxide solution, giving a solution of moderate viscosity and substantially free of fibers.

In the foregoing description of this invention, we have been concerned almost exclusively with its preferred embodiments, or with the utilization of steeping baths containing caustic, or alkaline materials, degradation promoters, etc. The invention is, however, by no means confined to such processes and modifications. For example, the new cellulose derivatives can be prepared as follows:

(1) The cellulose may be steeped in a saturated solution of the urea for about an hour or for sufficient time to permit thorough penetration which proceeds more rapidly at a low temperature. It is then pressed to remove excess steeping liquor, dried, heated in an air-blast oven at about 150° C. until the soluble stage is reached, which under these conditions usually requires from about nine to about fourteen minutes. The product is then washed with water and dissolved in aqueous caustic with chilling. In this modification, the absence of sodium hydroxide makes the time of baking much more critical, so that care should be taken that the product does not become insoluble through too long baking.

(2) The cellulose may be steeped in a refluxing saturated solution of urea in an organic solvent such as pyridine, the refluxing being continued until the product is soluble in dilute caustic soda. It is then washed with water, and the product dissolved in aqueous caustic with chilling.

(3) The cellulose may be heated at 150°–160° C. with an excess of molten urea until a soluble product is obtained, then washed with water, dried, and the product dissolved in aqueous caustic, as already described.

The following examples illustrate the preparation of caustic-soluble urea-cellulose according to the three modifications outlined immediately above.

Example XIX

Seventy-three (73) grams of a standard sulfite wood pulp were steeped in a 40% aqueous solution of urea for four hours at 23° C. The pulp was pressed to 190 grams, dried overnight at 55°–60° C. in a current of air, and baked at 130° C. for thirty minutes. The product contained 1.46% nitrogen and was soluble in 10% aqueous caustic as usual.

Example XX

Alkali cellulose, aged to the proper point for xanthation, was washed with water until there was no alkaline reaction, then twice with 10% aqueous acetic acid and finally with water. It was then dried in vacuo for about two days. Two (2) grams of the alkali cellulose thus prepared were immersed in 50 cc. of pyridine and 20 grams of urea, and the mixture was heated to refluxing for approximately five hours. The cellulosic material was then washed with water and extracted with absolute alcohol. The product was dried in air and then in a 100° C. air-oven. Two and two-tenths (2.2) grams of a solid white product were obtained. This product dissolved readily at −5° C. in 10% aqueous sodium hydroxide, and the resulting solution was stable about two days at ordinary laboratory temperatures. Addition of acid to the solution precipitated the cellulose derivative.

Example XXI

Five (5) grams of air-dried wood pulp (low-viscosity type) were immersed in 100 grams of molten urea at 155°–160° C. for three and one-half hours, removed, washed with water until all unreacted urea was removed and dissolved in 10% caustic soda solution at about −10° C. The resulting solution was clear and suitable for casting films, etc.

The invention is by no means limited to the conditions set forth in the specific embodiments above but, on the contrary, it comprehends a wide variation from these conditions within the limits described below.

When the process is carried out batchwise and when an aqueous solution of urea and sodium hydroxide is used as the steeping bath as it is in the preferred embodiment of this invention, the concentration of the urea may be varied between 15% to saturation but little additional advantages are obtained by using more than about 20% of urea in the bath when the press ratio of about 2.5 is employed. In carrying out the process in continuous fashion using sheeted cellulose, the most effective range of urea concentrations in the steeping bath is 30–35% with a press ratio of 2.1, or 20–25% with a press ratio of 2.5. If less urea is used in the steeping bath( the press ratio remaining the same), the solubility of the product tends to decrease. On the other hand, increasing the urea content of the steeping bath tends to produce a white product, but if the baking is then continued too long insolubilization occurs more quickly in very much the same way as when the cellulose is steeped in aqueous urea alone.

In the batch process, the concentration of sodium hydroxide in the steeping bath may be varied from about 2–10% regardless of the urea content, while in the continuous process the most effecive concentrations range from about 4–8%. Concentrations below these limits in each case tend to result in products which yield fibery solutions of high viscosity and less satisfactory filterability, and concentrations above these limits tend to parchmentizing effects, the viscosity of the products in solution is markedly decreased and in the sheeted product the baked sheets tend to become more or less brittle.

The temperature of the steeping bath may be varied within rather wide limits without adverse effect on the solubility of the products. In the continuous process care should be taken to employ apparatus which is designed so that the sheets of cellulose which are weakened by passage through the steeping bath do not break under the tension to which they are subjected while passing through the squeeze rolls and into the baking oven. At temperatures of 50°–60° C. aqueous urea-caustic soda steeping baths do not swell the cellulose greatly and the sheet can be passed continuously through the apparatus without danger of breaking. At such temperatures, however, some of the urea is decomposed by the sodium hydroxide. For this reason it may be preferred to operate at lower temperatures at which the action of the caustic soda on the urea is negligible but at which more swelling of the cellulose by the sodium hydroxide occurs, with consequent greater weakening of the sheeted cellulose. To avoid breaking the sheets of cellulose when they are passed through the steeping bath at temperatures around 25° C., they may be passed through on a supporting screen or wire. If it is desired to steep at the higher temperatures, urea and caustic soda solutions of the proper concentration, together with any desired degradation promoters, etc., may be heated to the desired temperature and sprayed simultaneously upon the sheeted cellulose or introduced into the steeping bath immediately before use.

The press ratio which, as has already been pointed out, is merely the ratio of the weight of the pressed cellulose to that of the original dry cellulose, is adjusted with due regard to the concentration of the steeping liquor to the end that the desired amounts of urea and caustic soda are present in the pressed material. In general, a press ratio is used such that the ratios (after pressing) of urea to cellulose and of caustic soda to cellulose are greater than about 0.25 and 0.06, respectively. Press ratios of 2–3 are most suitable in this invention although they may be varied beyond these limits if desired. Low press ratios may be conducive to poor solubility of the final products if such ratios result in the presence of insufficient proportions of urea, while high press ratios require the eventual evaporation of large amounts of water in the drying and baking steps and are, therefore, uneconomical and impractical.

The pressed cellulose may be dried at any convenient temperature, 55°–60° C. being a convenient range for moderately quick drying. If the pressed cellulose is subjected to baking without appreciable previous drying, the urea-celluloses are of the high-viscosity type. On the other hand, if the pressed cellulose is dried at low temperatures for a considerable length of time and then baked, the resulting material is of a low-viscosity type. Thus, by careful regulation of time, temperature and method of drying, a whole series of urea-celluloses can be prepared exhibiting a wide range of viscosities. If desired, the drying and baking steps can be combined as in Example I.

The minimum practical baking temperature is approximately 120° C. Lower temperatures may be used but prolonged baking periods are necessary in such cases to give a soluble product. For example, at 60° C. a period of four or five days is required to produce a product soluble in dilute caustic soda. Temperatures ranging from this practical minimum up to 300° C. or even higher may be employed providing the time of treatment is shortened accordingly. The optimum period of baking depends on the temperature and the composition of the reaction mixture as determined in part by the press ratio employed. For example, in a given case using a press ratio of 2.5, the minimum baking time at 160° C. was fifteen minutes whereas at 130° C. it was thirty minutes. At 130° C. high viscosity pulps may be baked up to about three hours, and low viscosity pulps up to about one hour without obtaining a product insoluble in dilute caustic soda. At higher temperatures and/or lower press ratios, i. e., lower urea to cellulose ratios, shorter baking times are required, and vice versa. At 260° C., which is a convenient baking period in the continuous process, the preferred baking time is about two minutes using a press ratio of 2.0 and a reaction mixture containing about 37% urea, and with a press ratio of 2.1 the baking time does not usually exceed about three minutes for a soluble product. The maximum baking time which can be used to produce soluble products varies with the baking temperature and can best be determined by preliminary experimentation for each set of conditions. If the impregnated pulp is baked too long, insoluble products result. Continuing the baking beyond the time required to give maximum solubility tends to reduce the viscosity, and to darken the product.

It should be noted that the impregnated cellulose becomes soluble in dilute aqueous caustic only after it has been baked or heated for a sufficient length of time. It is thus apparent that the important phase of this reaction takes place in a substantially dry state. That is, reaction between the cellulose and the urea occurs chiefly during the baking step. This phenomenon is unique, because most reactions in cellulose chemistry have not been carried out in the absence of liquid media.

When ingredients replacing sodium hydroxide, urea, and water are used in the steeping bath, they can generally be employed in proportions corresponding to those outlined above. The proportions of degradation promoters, etc., which may be used in the steeping baths or in subsequent operations will usually be of the same order of magnitude as those given in the examples, and such examples may be used as guides in the preparation of other steeping baths. It will be recognized that the best conditions cannot be stated for every possible combination of conditions and must, in many cases, be ascertained by preliminary experimentation.

In the absence of sodium hydroxide or other alkaline materials such as those disclosed in the examples, the baking time is sharply limited if products soluble in dilute caustic are to be obtained. For example, cellulose impregnated with urea alone and baked at 170° C. passes to the insoluble stage when baked for only about fourteen minutes. Yet, if baked less than about nine minutes at this temperature, products of inferior solubility may result. The presence of sodium hydroxide or other materials of the types described, however, makes it possible to vary the baking period over considerable limits without getting insoluble products.

The use of standard types of wood pulp or cotton fibers in the continuous process ordinarily results in the production of urea-celluloses, the viscosities of which are too high for convenience in the production of films, fibers, etc. This difficulty may be overcome in three ways, namely, (1) by starting with low-viscosity cellulose, (2) by impregnating high-viscosity cellulose with a steeping bath of the usual composition and aging at suitable temperatures (e. g., 25° C.) for sufficient periods of time to produce the desired reduction in viscosity, or (3) by the use of degradation promoters. The impregnated pulp can then be baked and dissolved in aqueous caustic in the usual manner. The aging step is also of value in that it tends to yield a more nearly white product.

In any of the processes described herein, the cellulose may be employed in any desired form, as for example, in the form of sheets, or it may be added to the steeping bath in a dispersed condition, as for example, by first dispersing it in a paper beater and then adding to an aliquot portion of the slurry sufficient caustic and urea to produce a solution having the same composition as the usual steeping bath. The resulting slurry may be agitated for a few minutes in order to insure thorough impregnation of the cellulose, which may then be filtered off, pressed into sheets if desired, and subsequently treated in the usual manner. If the cellulose is not used in sheet form in the continuous process, the apparatus should be modified to handle the shredded impregnated material or the slurry.

The urea-cellulose described herein are preferably employed in aqueous solutions containing 6–10% caustic soda and 1–2% zinc oxide. The preparation of these solutions has already been described. Within the limits mentioned, variations in the concentration of caustic or zinc oxide have comparatively little effect upon the properties of the urea-cellulose solutions or of the films, filaments, etc., prepared therefrom.

The aqueous caustic soda solutions of urea-celluloses, as already mentioned, may be coagulated by addition of acids. By passing the solutions into dilute aqueous solutions of acids such as acetic, hydrochloric, sulfuric, phosphoric, etc., or into solutions of salts such as sodium sulfate, ammonium sulfate, sodium bisulfite or solutions of mixtures of acids and their salts, fibers or filaments can be formed which, after washing, can be dried to form useful articles. The urea-celluloses may also be coagulated by treating their aqueous caustic solutions with organic solvents such as alcohols, hydrocarbons, or with water, steam, etc. The nature and composition of the coagulating bath may be varied widely and many modifications thereof will be apparent.

The cellulose derivatives described herein are useful for preparing foils or pellicles which resemble foils or pellicles of regenerated cellulose (e. g., "Cellophane") or cellulose derivatives such as cellulose acetate and ethyl cellulose. Such foils have excellent appearance, strength and flexibility. The new cellulose derivatives can also be spun into filaments and fibers, which are useful in the manufacture of yarns, textiles, etc., or they can be fashioned into bottle caps, bands, sponges, etc. They are, moreover, useful in the sizing, coating and impregnating arts as, for example, for sizing and coating cloth and other textile materials or paper and leather. They may also be used as coatings over rigid surfaces such as wood metals, concrete, brick, plaster, and stone. For any of these purposes they may be used alone or in admixture with each other or in admixture with modifying agents such as other cellulose derivatives, natural and synthetic resins, oils, waxes, pigments, and dyes. They may also be employed as raw materials in other cellulose reactions, as in the preparation of cellulosic ethers, esters, etc.

The process described herein has many advantages. It affords a practical method for preparing a series of caustic-soluble nitrogen-containing cellulose derivatives which are highly useful. All of the operations are simple, and only inexpensive raw materials are employed throughout. By suitable modification of the conditions, urea-celluloses of practically any viscosity can be made. The new cellulose derivatives dye more readily and to deeper shades than cellulose or cellulose derivatives commonly used in the manufacture of foils, filaments, etc. Because they are made from cheaper raw materials, the new derivatives are also cheaper than many other low-substituted cellulose derivatives such as the low-substituted alkyl celluloses.

The above description is for purposes of illustration only, it being understood that the invention includes all obvious variations and modifications coming within the scope thereof as defined in the appended claims.

We claim:

1. A process for preparing novel nitrogen-containing derivatives of cellulose which comprises reacting cellulose with a urea of the formula

wherein R is a member of the group consisting of oxygen and sulfur, $R_1$ and $R_2$ are of the group consisting of hydrogen, alkyl groups of less than five carbon atoms, and hydroxyalkyl groups of less than five carbon atoms, and wherein $R_1$ and $R_2$ may be the same or different radicals, and continuing the reaction until a product soluble in dilute caustic soda is formed.

2. A process for preparing novel nitrogen-containing derivatives of cellulose which comprises heating cellulose with a urea of the formula

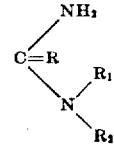

wherein R is a member of the group consisting of oxygen and sulfur, $R_1$ and $R_2$ are of the group consisting of hydrogen, alkyl groups of less than five carbon atoms, and hydroxyalkyl groups of less than five carbon atoms, and wherein $R_1$ and $R_2$ may be the same or different radicals, and continuing the heating until a product soluble in dilute caustic soda is obtained.

3. A process for preparing novel nitrogen-containing derivatives of cellulose which comprises heating an intimate mixture comprising cellulose and urea to reaction temperature, and maintaining such temperature until a product soluble in dilute caustic soda is obtained.

4. A process for preparing novel nitrogen-containing derivatives of cellulose which comprises heating an intimate mixture comprising cellulose and urea within a temperature range between about 120° C. to about 300° C., and maintaining such temperature until a product soluble in dilute caustic soda is obtained.

5. A process for preparing novel nitrogen-containing derivatives of cellulose which comprises preparing an intimate mixture comprising cellulose, urea and a compound having an alkaline reaction in aqueous solution, heating the mixture to reaction temperature, and maintaining such temperature until a product soluble in dilute caustic soda is obtained.

6. A process for preparing novel nitrogen-containing derivatives of cellulose which comprises preparing an intimate mixture comprising cellulose, urea and hydrogen peroxide, heating the mixture to reaction temperature, and maintaining such temperature until a product soluble in dilute caustic soda is obtained.

7. A process for preparing novel nitrogen-containing derivatives of cellulose which comprises preparing an intimate mixture comprising cellulose, urea and sodium hydroxide, heating said mixture to reaction temperature, and maintaining such temperature until a product soluble in dilute caustic soda is formed.

8. A process according to claim 7 wherein the mixture is heated to a temperature within the range of about 120° C. to about 300° C.

9. A process for preparing novel nitrogen-containing derivatives of cellulose which comprises steeping cellulose in a solution containing urea, pressing off the excess solution, heating to reaction temperature, and maintaining such temperature until a product soluble in dilute caustic soda is obtained.

10. A process according to claim 9 wherein the urea is dissolved in water.

11. A process according to claim 9 wherein the urea is dissolved in a non-volatile organic solvent for urea boiling below about 150° C.

12. A process for preparing novel nitrogen-containing derivatives of cellulose which comprises steeping cellulose in a solution containing urea and caustic soda, pressing off the excess solution, removing water by drying, heating to a reaction temperature, and maintaining such temperature until a product soluble in dilute caustic soda is formed, and washing such product.

13. A process according to claim 12 wherein the pressed mixture contains from 2 to 12 parts by weight of caustic soda, and from 15 to 50 parts of urea per hundred parts of cellulose.

14. A process according to claim 12 wherein the pressed mixture contains from 4 to 8 parts of caustic soda and from 20 to 40 parts of urea per hundred parts of cellulose.

15. A process according to claim 12 wherein the reaction temperature ranges between about 120° C. to about 300° C.

16. A continuous process for the preparation of novel nitrogen-containing derivatives of cellulose which comprises continuously passing sheet cellulose in order through an aqueous solution comprising from about 4 to 8% by weight of sodium hydroxide, and about 20 to 35% by weight of a urea of the formula $$\begin{array}{c} NH_2 \\ C=R \\ N \\ R_1 \\ R_2 \end{array}$$

wherein R is a member of the group consisting of oxygen and sulfur, $R_1$ and $R_2$ are of the group consisting of hydrogen, alkyl groups of less than five carbon atoms, and hydroxyalkyl groups of less than five carbon atoms, and wherein $R_1$ and $R_2$ may be the same or different radicals, through a pressing zone wherein the solution content of the impregnated sheet is reduced to 1.1 to 1.5 parts by weight of solution per part of original dry cellulose, and through a heating zone of sufficient temperature and duration whereby the sheet is dried and the urea is reacted with cellulose to form a nitrogen-containing derivative of cellulose soluble in dilute caustic alkali.

17. New nitrogen-containing derivatives of cellulose consisting of cellulose reacted with a urea of the formula $$\begin{array}{c} NH_2 \\ C=R \\ N \\ R_1 \\ R_2 \end{array}$$

wherein R is a member of the group consisting of oxygen and sulfur, $R_1$ and $R_2$ are of the group consisting of hydrogen, alkyl groups of less than five carbon atoms, and hydroxyalkyl groups of less than five carbon atoms, and wherein $R_1$ and $R_2$ may be the same or different radicals, said derivatives containing from about 1.0 to 2.5% of nitrogen and being soluble in dilute caustic soda.

18. New nitrogen-containing derivatives of cellulose prepared according to the process of claim 3, said derivatives containing from about 1.0 to 2.5% of nitrogen and being soluble in dilute caustic soda.

19. As a new composition of matter, nitrogen-containing derivatives of cellulose prepared according to the process of claim 3, dissolved in dilute caustic soda.

20. A shaped article comprising a cellulose derivative obtainable by the process of claim 3.

JULIAN W. HILL.
RALPH A. JACOBSON.

---

CERTIFICATE OF CORRECTION.

Patent No. 2,134,825.  November 1, 1938.

JULIAN W. HILL, ET AL.

It is hereby certified that error appears in the printed specification of the above numbered patent requiring correction as follows: Page 1, second column, line 7, for "cautic" read caustic; page 2, second column, line 34, for "stabilitv" read stability; line 49, for the word "broken" read brown; page 4, first column, line 40, for "55%" read 55°; page 6, second column, line 28, for "effecive" read effective; page 7, second column, line 65, for "urea-cellulose" read urea-celluloses; and that the said Letters Patent should be read with this correction therein that the same may conform to the record of the case in the Patent Office.

Signed and sealed this 20th day of December, A. D. 1938.

Henry Van Arsdale (Seal)  Acting Commissioner of Patents.

solution, removing water by drying, heating to a reaction temperature, and maintaining such temperature until a product soluble in dilute caustic soda is formed, and washing such product.

13. A process according to claim 12 wherein the pressed mixture contains from 2 to 12 parts by weight of caustic soda, and from 15 to 50 parts of urea per hundred parts of cellulose.

14. A process according to claim 12 wherein the pressed mixture contains from 4 to 8 parts of caustic soda and from 20 to 40 parts of urea per hundred parts of cellulose.

15. A process according to claim 12 wherein the reaction temperature ranges between about 120° C. to about 300° C.

16. A continuous process for the preparation of novel nitrogen-containing derivatives of cellulose which comprises continuously passing sheet cellulose in order through an aqueous solution comprising from about 4 to 8% by weight of sodium hydroxide, and about 20 to 35% by weight of a urea of the formula

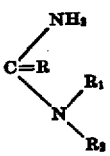

wherein R is a member of the group consisting of oxygen and sulfur, $R_1$ and $R_2$ are of the group consisting of hydrogen, alkyl groups of less than five carbon atoms, and hydroxyalkyl groups of less than five carbon atoms, and wherein $R_1$ and $R_2$ may be the same or different radicals, through a pressing zone wherein the solution content of the impregnated sheet is reduced to 1.1 to 1.5 parts by weight of solution per part of original dry cellulose, and through a heating zone of sufficient temperature and duration whereby the sheet is dried and the urea is reacted with cellulose to form a nitrogen-containing derivative of cellulose soluble in dilute caustic alkali.

17. New nitrogen-containing derivatives of cellulose consisting of cellulose reacted with a urea of the formula

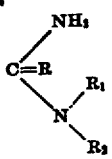

wherein R is a member of the group consisting of oxygen and sulfur, $R_1$ and $R_2$ are of the group consisting of hydrogen, alkyl groups of less than five carbon atoms, and hydroxyalkyl groups of less than five carbon atoms, and wherein $R_1$ and $R_2$ may be the same or different radicals, said derivatives containing from about 1.0 to 2.5% of nitrogen and being soluble in dilute caustic soda.

18. New nitrogen-containing derivatives of cellulose prepared according to the process of claim 3, said derivatives containing from about 1.0 to 2.5% of nitrogen and being soluble in dilute caustic soda.

19. As a new composition of matter, nitrogen-containing derivatives of cellulose prepared according to the process of claim 3, dissolved in dilute caustic soda.

20. A shaped article comprising a cellulose derivative obtainable by the process of claim 3.

JULIAN W. HILL.
RALPH A. JACOBSON.

CERTIFICATE OF CORRECTION.

Patent No. 2,134,825. November 1, 1938.

JULIAN W. HILL, ET AL.

It is hereby certified that error appears in the printed specification of the above numbered patent requiring correction as follows: Page 1, second column, line 7, for "cautic" read caustic; page 2, second column, line 34, for "stabilitv" read stability; line 49, for the word "broken" read brown; page 4, first column, line 40, for "55%" read 55°; page 6, second column, line 28, for "effecive" read effective; page 7, second column, line 65, for "urea-cellulose" read urea-celluloses; and that the said Letters Patent should be read with this correction therein that the same may conform to the record of the case in the Patent Office.

Signed and sealed this 20th day of December, A. D. 1938.

Henry Van Arsdale (Seal)  Acting Commissioner of Patents.